(12) United States Patent
Su et al.

(10) Patent No.: US 12,535,704 B2
(45) Date of Patent: Jan. 27, 2026

(54) DISPLAY DEVICE

(71) Applicants: Innolux Corporation, Miaoli County (TW); CARUX TECHNOLOGY PTE. LTD., Singapore (SG)

(72) Inventors: Ching-Tsung Su, Tainan (TW); Che-Chang Hu, Tainan (TW); Cheng-Tso Chen, Miaoli County (TW); Pao-Chuan Su, Tainan (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/904,026

(22) Filed: Oct. 1, 2024

(65) Prior Publication Data
US 2025/0155744 A1 May 15, 2025

Related U.S. Application Data

(60) Provisional application No. 63/598,933, filed on Nov. 14, 2023.

(30) Foreign Application Priority Data

Aug. 5, 2024 (CN) .......................... 202411066511.3

(51) Int. Cl.
*G02F 1/1333* (2006.01)
*G02F 1/1335* (2006.01)
*G02F 1/13357* (2006.01)
*G02F 1/1339* (2006.01)

(52) U.S. Cl.
CPC .... *G02F 1/13338* (2013.01); *G02F 1/133512* (2013.01); *G02F 1/133514* (2013.01); *G02F 1/133531* (2021.01); *G02F 1/133606* (2013.01); *G02F 1/133611* (2013.01); *G02F 1/1339* (2013.01)

(58) Field of Classification Search
CPC .......... G02F 1/13338; G02F 1/133531; G02F 1/133512; G02F 1/133514
See application file for complete search history.

(56) References Cited

U.S. PATENT DOCUMENTS

| | | |
|---|---|---|
| 2020/0341314 A1 | 10/2020 | Jung et al. |
| 2021/0405448 A1 | 12/2021 | Hou et al. |
| 2024/0042930 A1 | 2/2024 | Peterson et al. |

FOREIGN PATENT DOCUMENTS

| | | |
|---|---|---|
| CN | 111061090 | 4/2020 |
| CN | 112198716 | 1/2021 |
| CN | 119964454 | 5/2025 |

OTHER PUBLICATIONS

"Search Report of Europe Counterpart Application", issued on Mar. 28, 2025, p. 1-p. 12.

*Primary Examiner* — Lucy P Chien

(74) *Attorney, Agent, or Firm* — JCIPRNET

(57) ABSTRACT

A display device has a display region and a peripheral region. The display device includes a display panel, a backplate, and a sensor. The display panel includes a first polarizing plate and a second polarizing plate. The first polarizing plate is disposed in the display region. The second polarizing plate is disposed in the display region. The backplate overlaps the display panel. The sensor is disposed on the backplate and overlaps the first polarizing plate and the second polarizing plate that are located in the display region.

17 Claims, 7 Drawing Sheets

DISPLAY DEVICE

CROSS-REFERENCE TO RELATED APPLICATION

This application claims the priority benefit of U.S. provisional application Ser. No. 63/598,933, filed on Nov. 14, 2023, and China application serial no. 202411066511.3, filed on Aug. 5, 2024. The entirety of each of the above-mentioned patent applications is hereby incorporated by reference herein and made a part of this specification.

BACKGROUND

Technical Field

The disclosure relates to an electronic device, and particularly relates to a display device.

Description of Related Art

Conventional display devices typically incorporate sensors, such as digital camera systems, within peripheral regions of the display devices to perform image sensing. However, the physical dimensions of these sensors often impose limitations on achieving narrow bezel designs.

SUMMARY

The disclosure provides a display device, which is conducive to improvement of the feasibility of narrow bezel design.

In an embodiment of the disclosure, a display device has a display region and a peripheral region. The display device includes a display panel, a backplate, and a sensor. The display panel includes a first polarizing plate and a second polarizing plate. The first polarizing plate is disposed in the display region. The second polarizing plate is disposed in the display region. The backplate overlaps the display panel. The sensor is disposed on the backplate and overlaps the first polarizing plate and the second polarizing plate in the display region.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
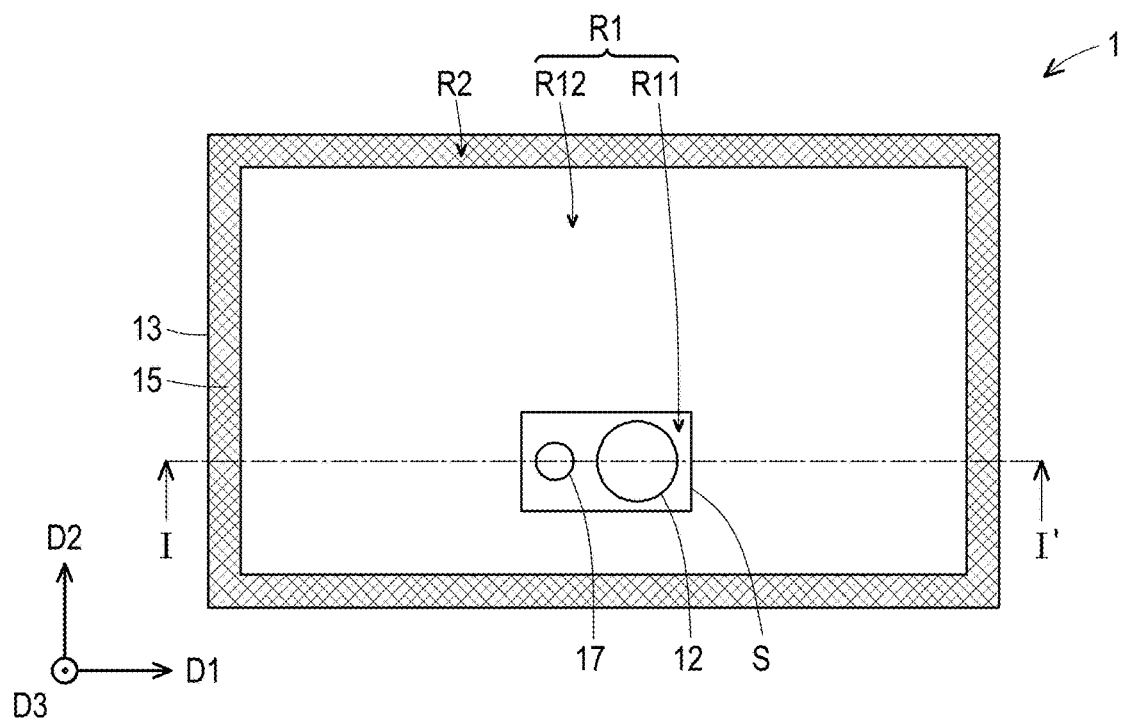
FIG. 1 is a schematic top view of a display device according to some embodiments of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

Certain terminologies are used throughout the specification and appended claims of the disclosure to refer to specific elements. Those skilled in the art should understand that electronic device manufacturers may refer to the same elements by different names. The disclosure does not intend to distinguish between elements that have the same function but different names. In the following specification and claims, terminologies such as "including", "containing", and "having" are open-ended terminologies, so should be interpreted as meaning "including but not limited to . . . ".

The directional terminologies mentioned in the disclosure, such as "upper," "lower," "front," "rear," "left," "right," and so on, are used with reference to the accompanying drawings. Therefore, the directional terminologies used are for illustration, but not to limit the disclosure. In the accompanying drawings, each drawing shows the general features of the methods, structures and/or materials adopted in a specific embodiment. However, the drawings should not be construed as defining or limiting the scope or nature covered by the embodiments. For instance, for clarity, the relative size, thickness, and position of each layer, region, and/or structure may be reduced or enlarged.

When a structure (or layer, element, substrate) is referred to as being located "on/above" another structure (or layer, element, substrate) in the disclosure, it may refer to the two structures being adjacent and directly connected, or it may mean that the two structures are adjacent but not directly connected. "Indirect connection" means that there is at least one intermediary structure (or intermediary layer, intermediary element, intermediary substrate, intermediary spacer) between the two structures, in which the lower surface of a structure is adjacent to or directly connected to the upper surface of the intermediary structure, and the upper surface of the other structure is adjacent to or directly connected to the lower surface of the intermediary structure. The intermediary structure may be a single-layer or multi-layer physical or non-physical structure, and there is no limitation. In the disclosure, when a structure is disposed "on" another structure, it may mean that the structure is "directly" on another structure, or that the structure is "indirectly" on another structure, with at least one structure sandwiched between the two structures. In addition, the terminologies "a given range is a first value to a second value" and "a given range falls within a range of a first value to a second value" means that the given range includes the first value, the second value, and other values in between.

The ordinal numbers used in the specification and claims, such as the terminologies "first", "second" and the like, to qualify an element do not imply or represent that the element or elements are preceded with any ordinal numbers, nor do they represent the order of a certain element and another element, or the order in the manufacturing method, and are used for clearly distinguishing an element with one name from another element with the same name. Different terminologies may be used in the claims and the specification, and accordingly, a first element in the specification may be a second element in the claims.

The electrical connection or coupling described in this disclosure may refer to direct connection or indirect connection. In the case of direct connection, the endpoints of the elements on the two circuits are directly connected or are connected to each other by a conductor segment. In the case of indirect connection, between the end points of the elements on the two circuits there are switches, diodes, capacitors, inductances, resistors, other suitable elements, or a combination of the above-mentioned elements, but the disclosure is not limited thereto.

In this disclosure, the measurement of the thickness, the length, and the width may be obtained by applying an optical microscope (OM), while the thickness or the width may be measured from cross-sectional images in an electron microscope, which should however not be construed as a limitation in the disclosure. Additionally, there may be a certain margin of error between any two values or directions applied for comparison. In addition, the phrase "a given range is a first value to a second value," "a given range falls within a range of a first value to a second value," or "given range between a first value and a second value" means that the given range includes the first value, the second value, and other values in between. If a first direction is perpendicular to a second direction, the angle between the first direction and the second direction may be between 80 degrees and 100 degrees. If the first direction is parallel to the second direction, the angle between the first direction and the second direction may be between 0 degrees and 10 degrees.

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

The electronic device disclosed in the specification may include a display device, a backlight device, an antenna device, a packaging device, a sensing device, or a tiled device, but is not limited thereto. The electronic device may be a foldable or flexible electronic device. The display device may be a non-self-luminous display device or a self-luminous display device. The electronic device may include, for instance, liquid crystal, light emitting diode, fluorescence, phosphor, quantum dot (QD), other suitable display media, or a combination of the foregoing. The antenna device may include, for instance, a reconfigurable intelligent surface (RIS), a frequency selective surface (FSS), an RF-filter, a polarizer, a resonator, an Antenna, and so on. The antenna device may be a liquid crystal antenna device or varactor diodes. The sensing device may be a sensing device for sensing capacitance, light, heat, or ultrasonic waves, but is not limited thereto. In the disclosure, the electronic device may include electronic elements, and the electronic elements may include passive elements and active elements, such as capacitors, resistors, inductors, diodes, transistors, and the like. The diodes may include light emitting diodes, varactor diodes, or photodiodes. The light emitting diodes may include, for instance, organic light emitting diodes (OLED), sub-millimeter light emitting diodes (mini-LED), micro light emitting diodes (micro-LED), or quantum dot light emitting diodes (quantum dot LED), but is not limited thereto. The tiled device may be, for instance, a display tiled device or an antenna tiled device, but is not limited thereto. It should be noted that the electronic device may be any arrangement and combination of the foregoing, but not limited to thereto. In addition, the appearance of the electronic device may be rectangular, circular, polygonal, in a shape with curved edges, or in other suitable shapes. The electronic device may have peripheral systems such as a driving system, a control system, a light source system . . . and the like, so as to support a display device, an antenna device, a wearable device (e.g., including augmented reality or virtual reality), an in-vehicle device (e.g., including car windshield), or a tiled device.

Figure 2:
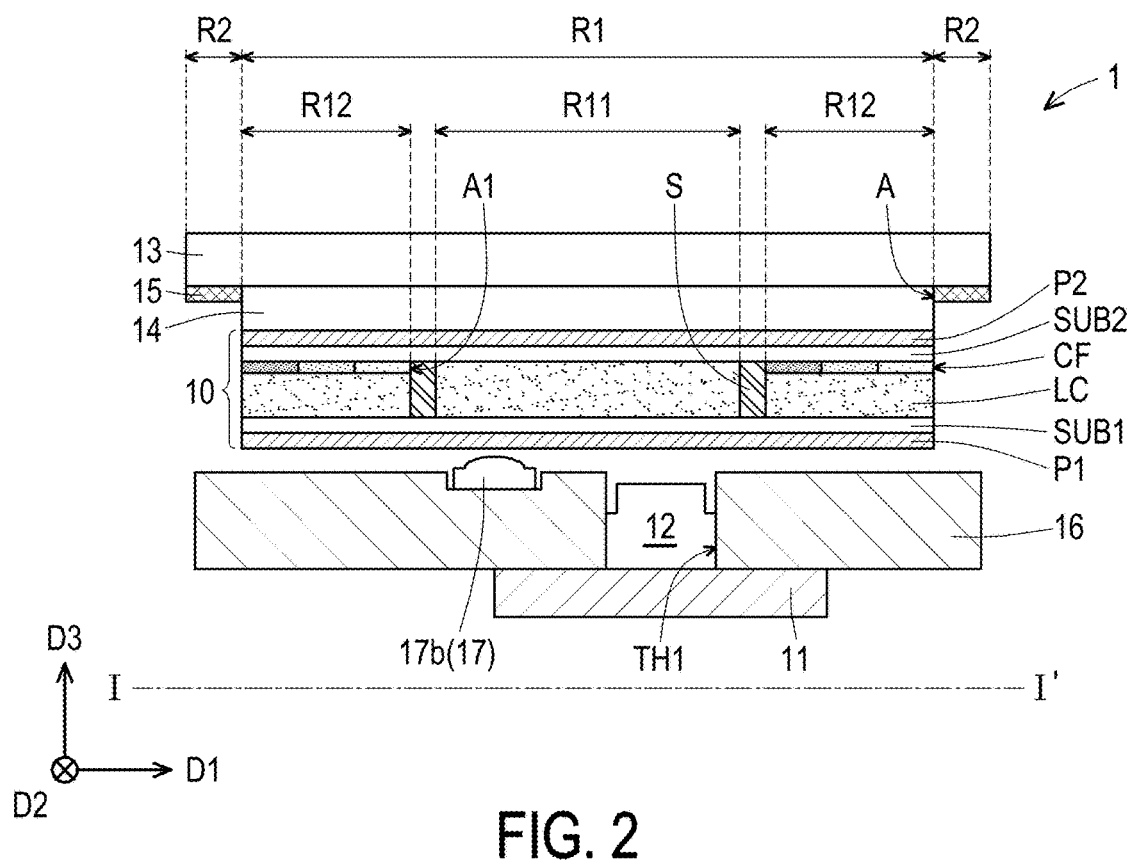
FIG. 2 is a schematic cross-sectional view corresponding to a sectional line I-I' in FIG. 1.
Figure 3:
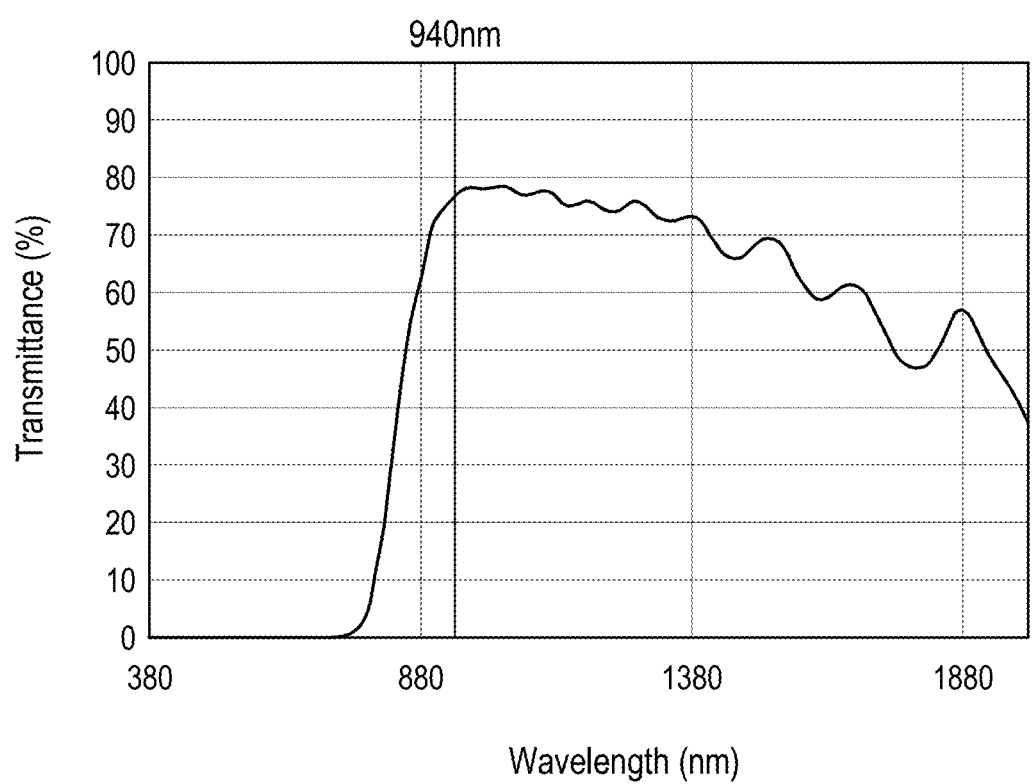
FIG. 3 is a diagram illustrating a wavelength-transmittance relationship of a display panel according to some embodiments of the disclosure.
Figure 4:
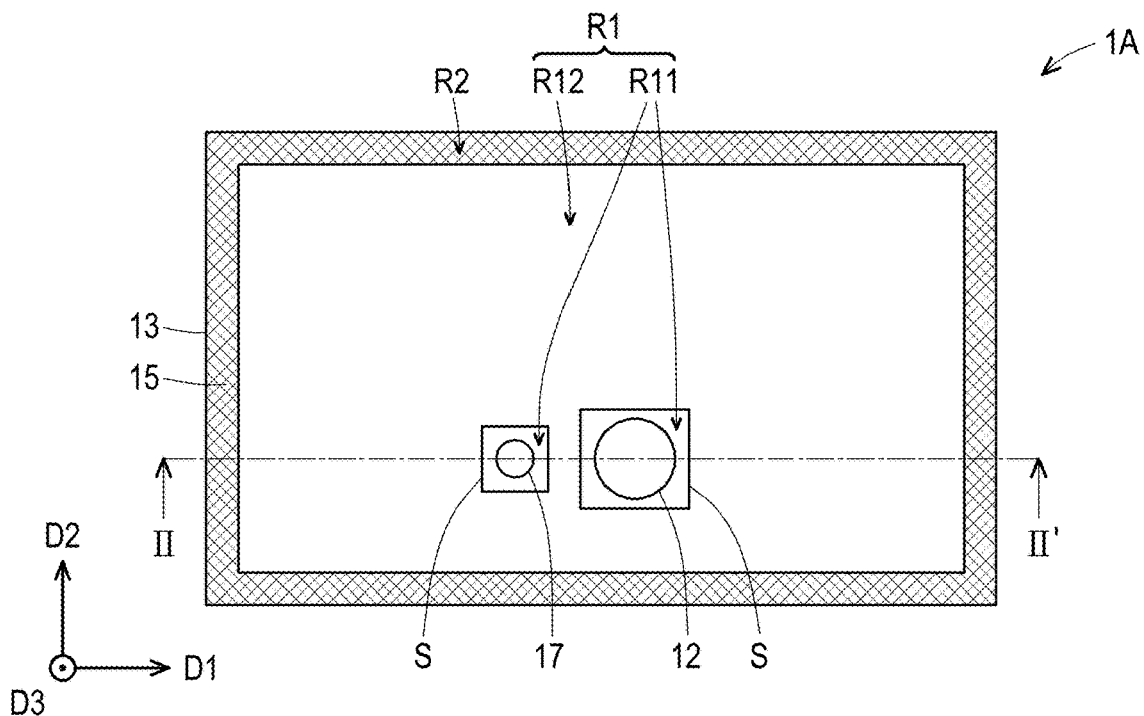
FIG. 4 is a schematic top view of a display device according to some embodiments of the disclosure.
Figure 5:
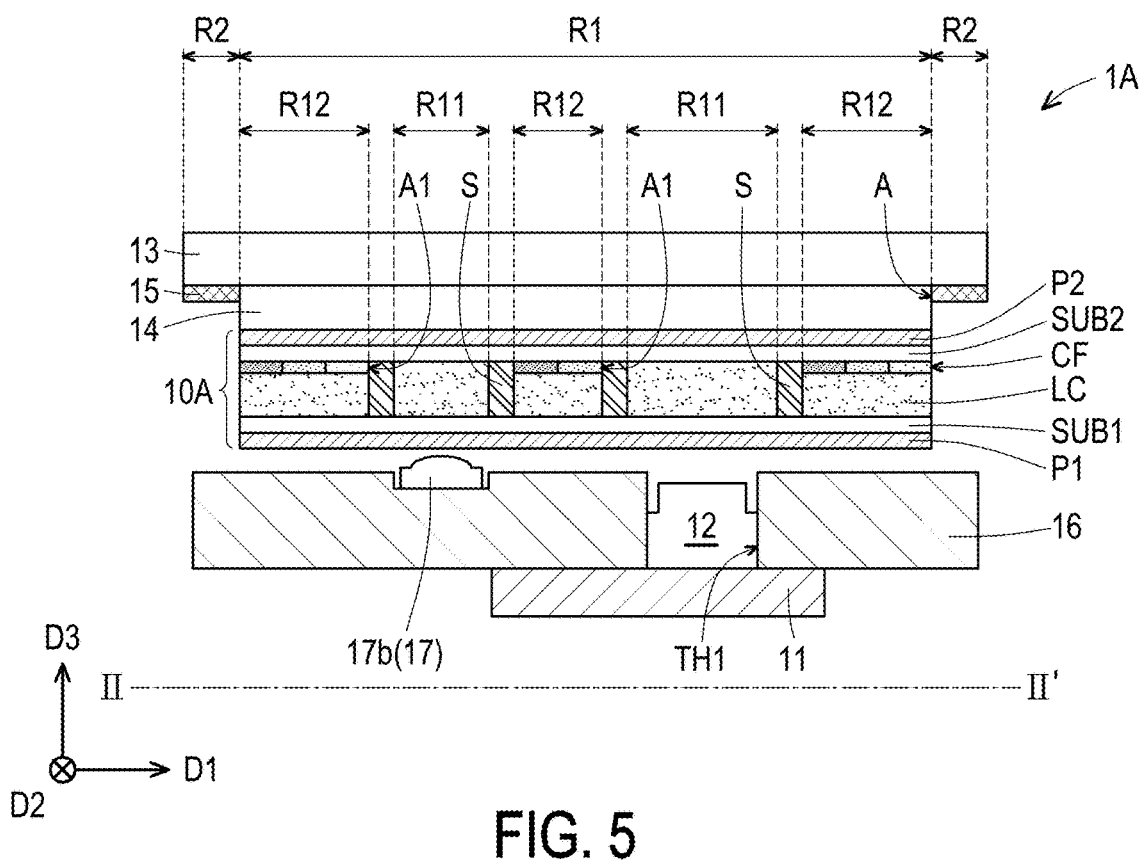
FIG. 5 is a schematic cross-sectional view corresponding to a sectional line II-II' in FIG. 4.
Figure 6:
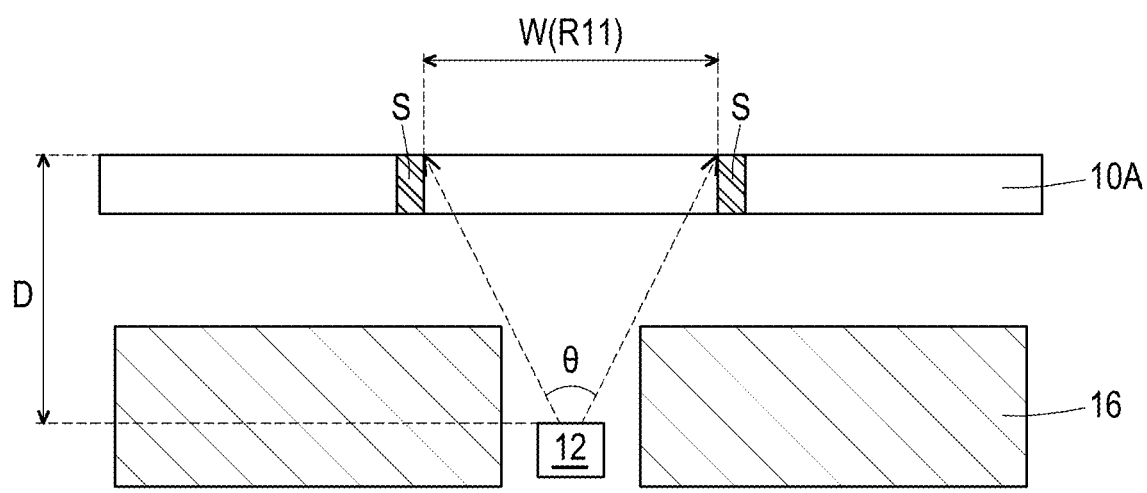
FIG. 6 is a schematic simplified cross-sectional view of a display device according to some embodiments of the disclosure.
Figure 7:
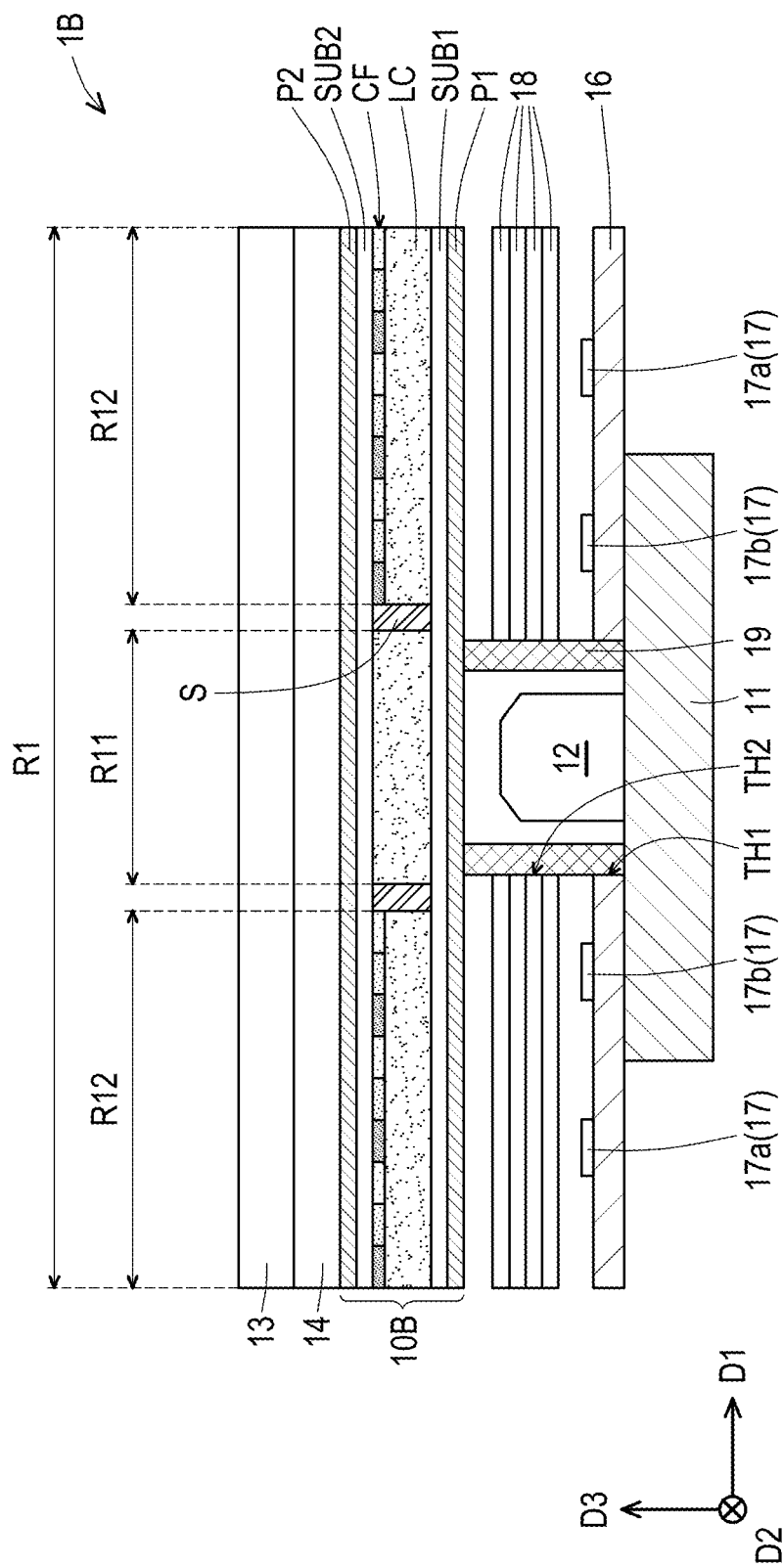
FIG. 7 is a schematic partial cross-sectional view of a display device according to some embodiments of the disclosure.
Figure 8:
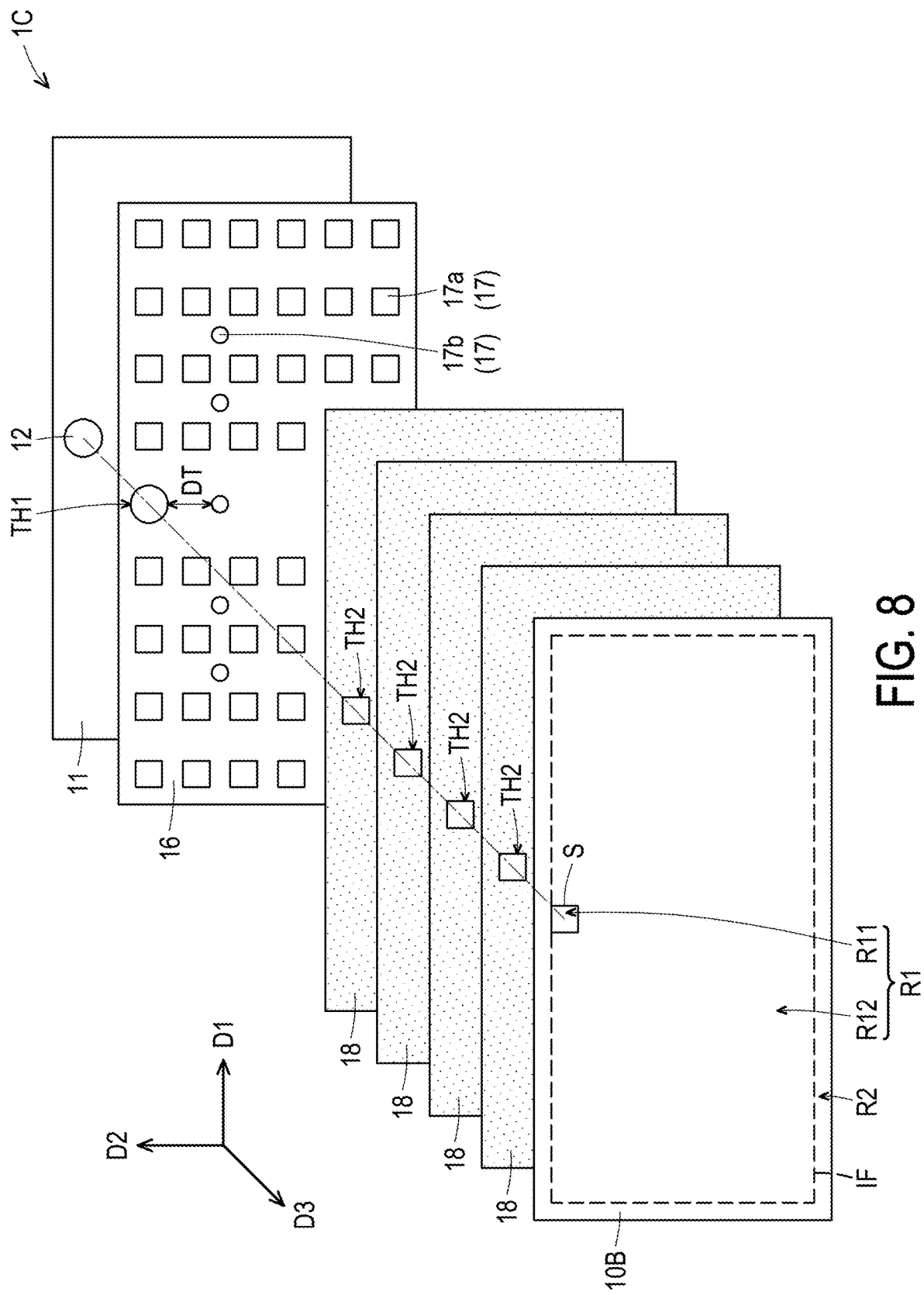
FIG. 8 is a schematic exploded view of a display device according to some embodiments of the disclosure.
Figure 9:
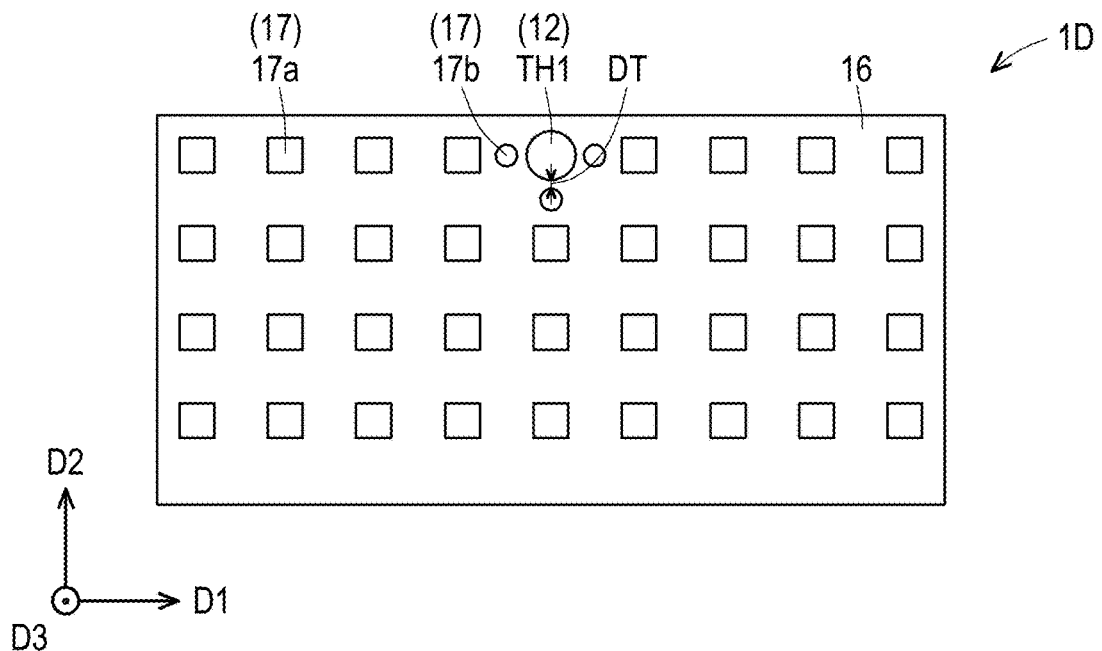
FIG. 9 and FIG. 10 are schematic top views of light boards in two display devices according to some embodiments of the disclosure, respectively.
Figure 10:
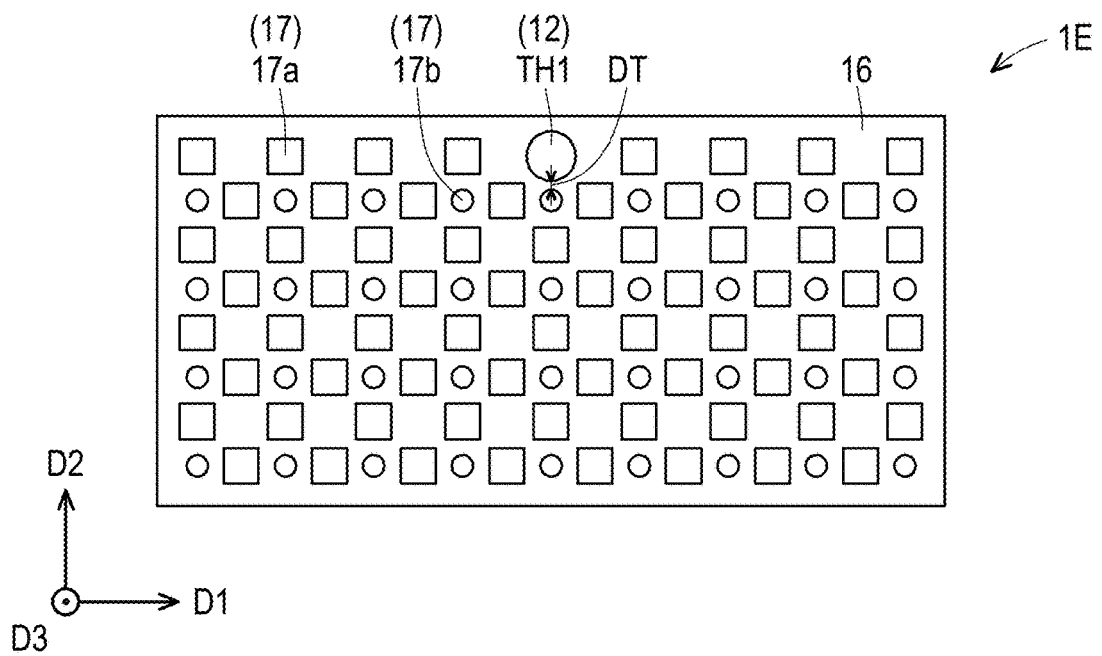

FIG. 1 is a schematic top view of a display device according to some embodiments of the disclosure. FIG. 2 is a schematic cross-sectional view corresponding to a sectional line I-I' in FIG. 1. FIG. 3 is a diagram illustrating a wavelength-transmittance relationship of a display panel according to some embodiments of the disclosure. FIG. 4 is a schematic top view of a display device according to some embodiments of the disclosure. FIG. 5 is a schematic cross-sectional view corresponding to a sectional line II-II' in FIG. 4. FIG. 6 is a schematic simplified cross-sectional view of a display device according to some embodiments of the disclosure. FIG. 7 is a schematic partial cross-sectional view of a display device according to some embodiments of the disclosure. FIG. 8 is a schematic exploded view of a display device according to some embodiments of the disclosure. FIG. 9 and FIG. 10 are schematic top views of light boards in two display devices according to some embodiments of the disclosure, respectively. Here, the illustration of the display panel is omitted from FIG. 9 and FIG. 10 to clearly show the relative arrangement relationship between a plurality of light emitting units and the sensor.

It should be noted that, in the following exemplary embodiments, features from several different embodiments may be replaced, recombined, or mixed to complete other embodiments without departing from the spirit of this disclosure. The features between various embodiments may be arbitrarily mixed and matched as long as they do not contradict the inventive spirit nor conflict with each other.

With reference to FIG. 1 and FIG. 2, a display device 1 may have a display region R1 and a peripheral region R2. The display device 1 may include a display panel 10, a backplate 11, and a sensor 12. The display panel 10 includes a first polarizing plate P1 and a second polarizing plate P2. The first polarizing plate P1 is disposed in the display region R1. The second polarizing plate P2 is disposed in the display region R1. The backplate 11 overlaps the display panel 10. The sensor 12 is disposed on the backplate 11 and overlaps the first polarizing plate P1 and the second polarizing plate P2 in the display region R1.

In detail, the display region R1 may be configured to display image information, such as text or graphics. The peripheral region R2 (such as the grid region in FIG. 1) is located on at least one side of the display region R1 and may be configured to accommodate peripheral circuits (not shown), circuit boards (not shown), flexible circuit boards (not shown), driving elements (not shown), other elements (not shown), or combinations thereof. In some embodiments, the peripheral region R2 may be at least adjacent to one of the edges of the display region R1. For instance, as shown in FIG. 1, the peripheral region R2 may be adjacent to and surround the four edges of the display region R1, which should however not be construed as a limitation in the disclosure. Alternatively, the display device 1 may not have the peripheral region R2, and the aforementioned peripheral circuits, circuit boards, flexible circuit boards, driving elements, and so on may overlap the display region R1 in a thickness direction (such as a direction D3) of the display device, e.g., disposed on one side of the backplate 11 away from the display panel 10, which should however not be construed as a limitation in the disclosure.

In some embodiments, as shown in FIG. 1 or FIG. 2, in addition to the display panel 10, the backplate 11, and the sensor 12, the display device 1 may further include a cover plate 13, a bonding layer 14, and a decoration layer 15. The cover plate 13 may be disposed above the display panel 10 through the bonding layer 14, and the cover plate 13 may be configured to protect elements or film layers below the cover plate 13. The cover plate 13 may be a rigid substrate or a flexible substrate. A material of the cover plate 13 may include glass, quartz, ceramics, sapphire, plastics, or combinations thereof, which should however not be construed as a limitation in the disclosure. The plastics may include polycarbonate (PC), polyimide (PI), polypropylene (PP), polyethylene terephthalate (PET), other suitable flexible materials, or combinations of the aforementioned materials, which should however not be construed as a limitation in the disclosure. The bonding layer 14 may include a light transmitting adhesive layer, such as optical clear adhesive (OCA) or optical clear resin (OCR), which should however not be construed as a limitation in the disclosure.

The decoration layer 15 is disposed on a surface of the cover plate 13 facing the display panel 10 and located in the peripheral region R2 to cover elements that are not intended to be seen by users (such as the aforementioned peripheral circuit, circuit board, flexible circuit board, driving element, and so forth) in the display device 1. A material of the decoration layer 15 may include an opaque organic polymer material, such as a gray or black organic polymer material (e.g., a black matrix), which should however not be construed as a limitation in the disclosure. The decoration layer 15 may have an opening A that exposes the display region R1, allowing users to see image information displayed in the display region R1.

The display panel 10 may serve to provide the image information. The display panel 10 may be a non-self-emissive display panel or a self-emissive display panel. The non-self-emissive display panel may be, for instance, a liquid crystal display panel, which should however not be construed as a limitation in the disclosure. The self-emissive display panel may be, for instance, a light emitting diode display panel, which should however not be construed as a limitation in the disclosure. The light emitting diodes may include, for instance, OLED, mini-LED, micro-LED, or quantum dot LED, which should however not be construed as a limitation in the disclosure.

The liquid crystal display panel is taken as an example. As shown in FIG. 2, in addition to the first polarizing plate P1 and the second polarizing plate P2, the display panel 10 may further include a first substrate SUB1, a second substrate SUB2, a liquid crystal layer LC, a stopper wall S, and a light modulating layer CF.

The first substrate SUB1 is adjacent to the first polarizing plate P1. For instance, the first polarizing plate P1 may be attached to a surface of the first substrate SUB1 facing the backplate 11. The first substrate SUB1 may be a rigid substrate or a flexible substrate. A material of the first substrate SUB1 may include glass, quartz, ceramics, sapphire, or plastics, which should however not be construed as a limitation in the disclosure. The plastics may include PC, PI, PP, PET, other suitable flexible materials, or combinations of the aforementioned materials, which should however not be construed as a limitation in the disclosure.

The second substrate SUB2 is disposed corresponding to the first substrate SUB1 and adjacent to the second polarizing plate P2. For instance, the second substrate SUB2 at least partially overlaps the first substrate SUB1 in the direction D3, and the second polarizing plate P2 may be attached to a surface of the second substrate SUB2 facing the cover plate 13. The second substrate SUB2 may also be a rigid substrate or a flexible substrate. A material of the second substrate SUB2 may refer to the material of the first substrate SUB1 and will not be repeated hereinafter.

The liquid crystal layer LC is disposed between the first substrate SUB1 and the second substrate SUB2. The type of the liquid crystal layer LC may not be limited. For instance, the liquid crystal layer LC may include twisted nematic liquid crystal, vertical alignment liquid crystal, or in plane switching liquid crystal, which should however not be construed as a limitation in the disclosure.

The stopper wall S is disposed between the first substrate SUB1 and the second substrate SUB2 and serves to define a first region R11 of the display region R1 and a second region R12 adjacent to the first region R11. The first region R11 corresponds to the sensor 12. As shown in FIG. 1 and FIG. 2, the first region R11 may at least overlap the sensor 12 in the direction D3. In some embodiments, as shown in FIG. 1, a top view shape of the stopper wall S may be a closed shape, where the region inside the stopper wall S is the first region R11, and the region outside the stopper wall S is the second region R12. The closed shape may be a rectangular shape, an annular shape, or any other polygonal shape, which may not be limited herein. In some embodiments, a material of the stopper wall S (also referred to as a spacer) may include a non-transparent material to reduce light interference between the first region R11 and the second region R12. Alternatively, the material of the stopper wall S may include a transparent material, and a light shielding material (not shown, such as a light absorbing material or a light reflective material) may be formed on a sidewall of the stopper wall S to reduce light interference between the first region R11 and the second region R12 and/or improve light utilization efficiency. In some embodiments, as shown in FIG. 2, the first region R11 inside the stopper wall S may be filled with the liquid crystal layer LC to reduce the impact resulting from light refraction on the sensor 12 receiving light signals, reduce visual differences between the first region R11 and the second region R12, or reduce the visibility of the first region R11.

The light modulating layer CF is disposed between the liquid crystal layer LC and the second substrate SUB2 and has a first opening region A1, where the first opening region A1 may correspond to the first region R11. The light modulating layer CF may include a color filter layer, a color conversion layer, or a combination thereof. The light modulating layer CF may be disposed on the surface of the second substrate SUB2 facing the liquid crystal layer LC. The first opening region A1 of the light modulating layer CF is a region where the light modulating layer CF is hollowed out, for instance, a region where no color filter pattern is disposed. By making the first opening region A1 correspond to the first region R11, the interference of the light modulating layer CF on the first region R11 (such as light absorption, refraction, and/or reflection) may be reduced, thereby improving the clarity or accuracy of image sensing. In some embodiments, the light modulating layer CF may be disposed corresponding to the first region R11 and the second region R2 to facilitate the manufacturing process and/or assembly.

According to different requirements, the display panel 10 may further include one or more elements or film layers. For instance, although not shown in FIG. 1 or FIG. 2, the display panel 10 may further include a plurality of switching elements and a plurality of electrodes. The switching elements and the electrodes may be sequentially disposed on the first substrate SUB1, and the electrodes are electrically connected to the switching elements, respectively. By changing the voltage applied to the electrodes, a tilt direction of liquid crystal molecules (not shown) in the liquid crystal layer LC may be controlled, thereby controlling the transmittance of the display panel 10. In some embodiments, by placing the switching elements or other elements that may affect light transmission (such as the aforementioned light modulating layer CF or the black matrix not shown) outside the first region R11, the interference of elements affecting light transmission on the first region R11 (such as light absorption, refraction, and/or reflection) may be reduced, thereby improving the clarity or accuracy of image sensing. Alternatively, the switching elements and/or the light modulating layer CF in the first region R11 may not be removed (for instance, the first region R11 and the second region R12 of the display panel 10 may have the same configuration), and/or the fabrication of the stopper wall S may be omitted to facilitate the manufacturing process and/or assembly.

In the structure of the non-self-emitting display panel, the display device 1 may further include a light board 16 and a plurality of light emitting units 17 (FIG. 1 and FIG. 2 schematically show one of the light emitting units 17), where the light board 16 is disposed on the backplate 11 and has a first through hole TH1 overlapping the sensor 12, and the light emitting units 17 are disposed on the light board 16. In some embodiments, as shown in FIG. 1 or FIG. 2, at least one light emitting unit 17 (such as a second light emitting unit 17b) of the light emitting units 17 may be disposed adjacent to the sensor 12, and the at least one light emitting unit 17 (such as the second light emitting unit 17b) may also be disposed corresponding to the first region R11 of the stopper wall S. In a top view, as shown in FIG. 1, the stopper wall S may surround the sensor 12 and the second light emitting unit 17b. An output light wavelength of the second light emitting unit 17b may correspond to an absorption wavelength of the sensor 12. For instance, the sensor 12 may be a non-visible light sensor (such as an infrared sensor), and the second light emitting unit 17b may include a non-visible light emitting element (such as an infrared light emitting diode), which should however not be construed as a limitation in the disclosure.

In some embodiments, at least one optical film (such as at least one optical film 18 shown in FIG. 7) may be disposed between the display panel 10 and the light board 16. The at least one optical film 18 may have a second through hole TH2 which corresponds to the first region R11 and overlaps at least one of the sensor 12 and the second light emitting unit 17b. For instance, the second through hole TH2 may overlap the sensor 12 (as shown in FIG. 7), overlap the second light emitting unit 17b, or overlap both the sensor 12 and the second light emitting unit 17b, which should however not be construed as a limitation in the disclosure. In some embodiments, the at least one optical film 18 may further have a third through hole (not shown in the drawings) adjacent to the second through hole, and the third through hole corresponds to or overlaps the second light emitting unit 17b, which should however not be construed as a limitation in the disclosure.

The backplate 11 may be a circuit board or a printed circuit board, and the backplate 11 may be electrically connected to the sensor 12. In some embodiments, although not shown, there may be a gap, an adhesive layer (e.g., foam), a buffer layer, and/or a locking structure between the backplate 11 and the light board 16.

The sensor 12 may be a light sensor, such as an infrared sensor, which should however not be construed as a limitation in the disclosure. According to different requirements, the number of the sensor 12 may be one or more, the number of the second light emitting unit 17b may be one or more, and the number of the stopper wall S may be one or more. The stopper walls S may be disposed corresponding to the sensors 12, respectively. For instance, in a top view, the stopper walls S may respectively surround one or more sensors 12, respectively surround one or more second light emitting units 17b, or respectively surround one or more sensors 12 and one or more second light emitting units 17b. In FIG. 1, the second light emitting unit 17b and the sensor 12 are arranged along a direction D1, and the stopper wall S surrounds one second light emitting unit 17b and one sensor 12. However, it should be understood that the respective numbers of the second light emitting unit 17b, the sensor 12, and the stopper wall S and the relative arrangement relationships and/or quantities, etc., may be changed according to actual requirements and are not limited to what is shown in FIG. 1. For instance, the second light emitting unit 17b and the sensor 12 may be arranged along a direction D2, which should however not be construed as a limitation in the disclosure. Both the direction D1 and the direction D2 are perpendicular to the direction D3, and the direction D1 and the direction D2 intersect each other, e.g., perpendicular to each other, which should however not be construed as a limitation in the disclosure.

In some embodiments, through the arrangement of the first polarizing plate P1, the liquid crystal layer LC, and the second polarizing plate P2, the transmittance of the first region R11 for visible light (such as light with a wavelength ranging from 380 nm to 750 nm) may approach zero, while the transmittance for light emitted by the second light emitting unit 17b (such as non-visible light) may be greater than or equal to 60% (with reference to FIG. 3). As such, the non-visible light emitted by the second light emitting unit 17b may penetrate the first region R11 and may be transmitted to an object to be detected, and the non-visible light reflected by the object to be detected may penetrate the first region R11 and may be transmitted to the sensor 12. The corresponding relationship between a transmission axis of the first polarizing plate P1 and a transmission axis of the second polarizing plate P2, in combination with different inactive or active states of the liquid crystal layer, will be described below. When the transmittance of the display panel 10 is being measured, a light source and the sensor are disposed on opposite sides of the display panel. If the light intensity output by the light source is a, and the light intensity received by the sensor is b, then the transmittance of the display panel 10 is equal to (b/a)*100%.

In FIG. 3, for light with a wavelength ranging from about 880 nm to about 1598 nm, the transmittance of the display panel 10 may be, for instance, greater than or equal to 60%, while for light with a wavelength of about 940 nm, the transmittance of the display panel 10 may be, for instance, greater than or equal to 70%. Under such a structure, the sensor 12 may be selected to receive light with a wavelength ranging from about 880 nm to about 1598 nm, e.g., a sensor that receives light with a wavelength of about 940 nm may be selected, which should however not be construed as a limitation in the disclosure.

Please refer again to FIG. 1 and FIG. 2. The polarizing plate (such as the first polarizing plate P1 and the second polarizing plate P2) generally refers to a structure that allows light in a specific polarizing direction to pass through while absorbing or reflecting light in other polarizing directions. For instance, a material of the polarizing plate may include an organic material, an inorganic material, or a combination thereof. In some embodiments, the transmission axis (not shown) of the first polarizing plate P1 may be perpendicular to the transmission axis (not shown) of the second polarizing plate P2. Under such a structure, the liquid crystal layer LC may be selected from, for instance, vertical alignment liquid crystal or in plane switching liquid crystal. Thus, when the liquid crystal layer LC in the first region R11 is in an inactive state (i.e., when no voltage is applied to one or more electrodes in the first region R11), the first region R11 presents a black screen due to its transmittance for visible light approaching zero, thereby hiding the sensor 12 or reducing the visibility of the sensor 12, while still allowing the sensor 12 to receive image light signals. In other embodiments, the transmission axis (not shown) of the first polarizing plate P1 may be parallel to the transmission axis (not shown) of the second polarizing plate P2. Under such a structure, the liquid crystal layer LC may be selected from twisted nematic liquid crystal. Thus, when the liquid crystal layer LC in the first region R11 is in an inactive state (i.e., when no voltage is applied to one or more electrodes in the first region R11), the first region R11 presents a black screen due to its transmittance for visible light approaching zero, thereby hiding the sensor 12 or reducing the visibility of the sensor 12, while still allowing the sensor 12 to receive image light signals.

When the liquid crystal layer LC in the second region R12 is also in an inactive state, both the first region R11 and the second region R12 may present black screens, for instance, thus having a consistent appearance and making it difficult for human eyes to detect the region where the sensor 12 is located (i.e., the first region R11). In some embodiments, the first region R11 may be disposed corresponding to the non-display region of the second region R12 (e.g., the region where a dynamic island is located during video conference). As such, when the liquid crystal layer LC in the second region R12 is in an active state (i.e., when the second region R12 displays an image), it is also difficult for the human eyes to detect the region where the sensor 12 is located. Whether the display panel 10 is powered off (e.g., when the liquid crystal layers LC in both the first region R11 and the second region R12 are inactive) or powered on (e.g., when the liquid crystal layer LC in the second region R12 is active, and the liquid crystal layer LC in the first region R11 is either active or inactive), as long as the sensor 12 and the second light emitting units 17b are activated, the sensor 12 may receive image light signals even though the region where the sensor 12 is located cannot be easily perceived by the human eyes, enabling continuous monitoring of the in-vehicle environment. In other embodiments, the liquid crystal layer LC may be selected from twisted nematic liquid crystal, and when the liquid crystal layer LC in the first region R11 is in an active state, the transmission axis (not shown) of the first polarizing plate P1 may be perpendicular to the transmission axis (not shown) of the second polarizing plate P2. In other embodiments, the liquid crystal layer LC may be selected from vertical alignment liquid crystal or in plane switching liquid crystal, and when the liquid crystal layer LC in the first region R11 is in an active state, the transmission axis (not shown) of the first polarizing plate P1 may be parallel to the transmission axis (not shown) of the second polarizing plate P2.

With reference to FIG. 4 and FIG. 5, the main differences between a display device 1A and the display device 1 in FIG. 1 and FIG. 2 are explained as follows. The display panel 10A includes two stopper walls S. In the top view, as shown in FIG. 4, the two stopper walls S respectively surround the sensor 12 and the second light emitting unit 17b. In some embodiments, the area occupied by the first region R11 or the width of the first region R11 corresponding to the sensor 12 may be different from the area occupied by the first region R11 or the width of the first region R11 corresponding to the second light emitting unit 17b. For instance, the area occupied by the first region R11 or the width of the first region R11 corresponding to the sensor 12 may be smaller than the area occupied by the first region R11 or the width of the first region R11 corresponding to the second light emitting unit 17b, which should however not be construed as a limitation in the disclosure.

In some embodiments, at least one optical film (such as at least one optical film 18 shown in FIG. 7) may be further disposed between the display panel 10A and the light board 16. The at least one optical film 18 may have a second through hole TH2 that overlaps at least one of the sensor 12 and the second light emitting unit 17b. For instance, the second through hole TH2 may overlap the sensor 12 (as shown in FIG. 7), overlap the second light emitting unit 17b, or overlap both the sensor 12 and the second light emitting unit 17b, which should however not be construed as a limitation in the disclosure. In some embodiments, the at least one optical film 18 may further have a third through hole (not shown) adjacent to the second through hole, where the third through hole may correspond to or overlap the second light emitting unit 17b, which should however not be construed as a limitation in the disclosure.

In some embodiments, an inner edge of the stopper wall S or the width of the first region R11 may be designed based on a distance between the sensor 12 and the display panel 10A and a field of view angle of the sensor 12. As shown in FIG. 6, the distance between the sensor 12 and the display panel 10A is D, the field of view angle of the sensor 12 is θ, and the width of the first region R11 is W, where W is greater than 0 and less than or equal to 4*D*tan(θ/2), i.e., 0<W≤4*D*tan(θ/2). For instance, the width W may be 0.5*D*tan(θ/2), 1*D*tan(θ/2), 1.5*D*tan(θ/2), 2*D*tan(θ/2), 3*D*tan(θ/2), 4*D*tan(θ/2), or any numeric value between these numeric values. As shown in FIG. 6, the distance D may be a distance in the direction D3 between a top surface of the sensor 12 and a top surface of the display panel 10A (e.g., a top surface of the first polarizing plate P1). The field of view angle θ is the angular range within which the sensor 12 may receive image light. Through the design of 0<W≤4*D*tan(θ/2), the sensor 12 may receive favorable image light signals or reduce the interference of stray light on the sensor 12 receiving the image light, which should however not be construed as a limitation in the disclosure. It should also be understood that the features depicted in FIG. 6 may be applicable to other embodiments of the disclosure and are not limited to the structure shown in FIG. 4 and FIG. 5. For instance, in the embodiments depicted in FIG. 1, FIG. 2, FIG. 7, and FIG. 8, the width of the first region R11 may also be greater than or equal to 0 and less than or equal to 4*D*tan(θ/2).

With reference to FIG. 7, the main differences between a display device 1B and the display device 1A depicted in FIG. 4 and FIG. 5 are explained as follows. The display device 1B may not have the peripheral region R2 (with reference to FIG. 4 and FIG. 5), and the display device 1B may not include the decoration layer 15 (with reference to FIG. 4 and FIG. 5), which should however not be construed as a limitation in the disclosure. Alternatively, the display device 1B may include the peripheral region R2 and the decoration layer 15. In the display device 1B, the stopper wall S of the display panel 10B is disposed corresponding to the sensor 12 but not disposed corresponding to the second light emitting unit 17b. For instance, in the direction D3, the first region R11 overlaps the sensor 12 and does not overlap the second light emitting unit 17b. The second region R12 corresponds to the light modulating layer CF and overlaps the first light emitting units 17a and the second light emitting unit 17b.

In some embodiments, the display device 1B may further include at least one optical film 18 (FIG. 7 schematically illustrates four optical films 18), and the at least one optical film 18 is disposed on the light emitting units 17 and has a second through hole TH2, where the second through hole TH2 overlaps the sensor 12. Specifically, the second through hole TH2 is disposed corresponding to the first region R11. The at least one optical film 18 may include a diffuser, a brightness enhancement film (BEF), a dual brightness enhancement film (DBEF), or a combination thereof. In some embodiments, the at least one optical film 18 may further have a third through hole (not shown in the drawings), where the third through hole corresponds to or overlaps the second light emitting unit 17b, which should however not be construed as a limitation in the disclosure.

By forming the second through hole TH2 in the region where the at least one optical film 18 overlaps the sensor 12, the interference of the at least one optical film 18 on image sensing may be reduced, thereby improving the clarity or accuracy of image sensing.

In some embodiments, as shown in FIG. 7, the light emitting units 17 may include a plurality of first light emitting units 17a and at least one second light emitting unit 17b, where the wavelength of the first light emitting units 17a is different from the wavelength of the at least one second light emitting unit 17b, and the at least one second light emitting unit 17b is disposed corresponding to the display region R1. For instance, the first light emitting units 17a may be visible light emitting units, while the at least one second light emitting unit 17b may be a non-visible light emitting unit, such as an infrared light emitting unit, which should however not be construed as a limitation in the disclosure. In some embodiments, the light modulating layer CF is disposed corresponding to or overlapping the first light emitting units 17a. In some embodiments, the light modulating layer CF is disposed corresponding to or overlapping the first light emitting units 17a and the at least one second light emitting unit 17b.

In some embodiments, the light emitting units 17 may be packaged light emitting units composed of at least one first light emitting unit 17a and at least one second light emitting unit 17b, which should however not be construed as a limitation in the disclosure.

In some embodiments, as shown in FIG. 7, the light emitting units 17 may be arranged in an array on a plane constituted by the direction D1 and the direction D2, thus forming a direct-type backlight module, which should however not be construed as a limitation in the disclosure. Alternatively, although not shown, the display device 1B may further include a light guide plate, and the light emitting units 17 may be arranged along a side of the light guide plate. For instance, the light emitting units 17 may be arranged in an array on a plane constituted by the direction D2 and the direction D3, thus forming an edge-type backlight module.

In some embodiments, the display device 1B may further include a support member 19, which is disposed in the first through hole TH1 and the second through hole TH2 and disposed between the backplate 11 and the display panel 10B, where the support member 19 may surround the sensor 12, for instance. For instance, the support member 19 may be a hollow sleeve, and the support member 19 may serve to secure the sensor 12 and/or support the at least one optical film 18. In some embodiments, a material of the support member 19 may include a light absorbing material or a light reflecting material, or a light absorbing layer or a light reflecting layer may be formed on the sidewall of the support member 19 to reduce light interference from adjacent light emitting units 17. It should be understood that the stacking relationship shown in FIG. 7 and the description (e.g., the optical film 18, the support member 19, the first light emitting units 17a, and so on) are also applicable to other embodiments.

With reference to FIG. 8, the main differences between a display device 1C and the display device 1B in FIG. 7 are described as follows. The display device 1C has the display region R1 and the peripheral region R2. In FIG. 8, an interface IF between the display region R1 and the peripheral region R2 is marked by a dashed line frame. Moreover, in the display device 1C, the light emitting units 17 include five second light emitting units 17b, and the five second light emitting units 17b are dispersedly disposed in an array formed by the first light emitting units 17a. In some embodiments, considering the light intensity received by the sensor 12, the shortest distance between the second light emitting units 17b and the first through hole TH1 (such as a distance DT) may range from 3 mm to 4500 mm, i.e., 3 mm≤DT≤4500 mm. It should be understood that the design shown in FIG. 8 is also applicable to other embodiments.

In other embodiments, as shown in a display device 1D in FIG. 9, the first light emitting units 17a disposed on the light board 16 may be arranged in an array along the direction D1 and the direction D2. On the other hand, the second light emitting units 17b may be disposed in a concentrated manner near the first through hole TH1, so as to shorten a light path of non-visible light or reduce light loss, which is conceive to reduction of the number of the second light emitting units 17b. It should be understood that the design of the light board 16 in FIG. 9 is also applicable to other embodiments.

In other embodiments, as shown in a display device 1E in FIG. 10, the first light emitting units 17a disposed on the light board 16 may be alternately arranged along the direction D1 to improve light output uniformity. On the other hand, the second light emitting units 17b may be dispersedly disposed on the light board 16 to balance the light output uniformity and the light output intensity. It should be understood that the design of the light board 16 in FIG. 10 is also applicable to other embodiments.

To sum up, in one or more embodiments of this disclosure, the feasibility of narrow bezel design may be improved through the arrangement of the sensor overlapping the display region, enabling the display device to achieve the narrow bezel design or even a bezel-less design. Besides, the visibility of the sensor may be reduced through the design of the sensor overlapping the first polarizing plate and the second polarizing plate.

The above embodiments simply serve to illustrate the technical solutions of the disclosure, but not to limit them; although the disclosure has been described in detail with reference to the foregoing embodiments, those skilled in the art should understand that the technical solutions described in the foregoing embodiments can still be modified, or some or all of the technical features thereof can be equivalently replaced, and these modifications or substitutions do not make the essence of the corresponding technical solutions deviate from the scope of the technical solutions of the embodiments of the disclosure.

Although the embodiments of the disclosure and their advantages have been disclosed as above, it should be understood that any person having ordinary knowledge in the technical field can make changes, substitutions and modifications without departing from the spirit and scope of the disclosure, and the features of each embodiment can be arbitrarily mixed and replaced with each other to form other new embodiments. In addition, the protection scope of the disclosure is not limited to the process, machine, manufacture, material composition, device, method and steps in the specific embodiments described in the specification; anyone with ordinary knowledge in the art can understand the present or future developed processes, machines, manufactures, compositions, devices, methods and steps from the disclosure, and anything that can perform substantially the same functions or achieve substantially the same results in the embodiments described herein can be used in accordance with the disclosure. Therefore, the protection scope of the disclosure includes the above-mentioned processes, machines, manufactures, material compositions, devices, methods and steps. In addition, each claim constitutes a separate embodiment, and the scope of the disclosure also includes combinations of each claim and the embodiment. The scope of protection of the disclosure shall be defined by the appended claims.

What is claimed is:

1. A display device, having a display region and a peripheral region and comprising:
a display panel, comprising:
a first polarizing plate, disposed in the display region; and
a second polarizing plate, disposed in the display region;
a backplate, overlapping the display panel;
a sensor, disposed on the backplate and overlapping the first polarizing plate and the second polarizing plate in the display region;
a light board, disposed on the backplate and having a first through hole;
a plurality of light emitting units, disposed on the light board, wherein the first through hole overlaps the sensor;
at least one optical film, disposed on the light emitting units and having a second through hole, wherein the second through hole overlaps the sensor; and
a support member, disposed in the first through hole and the second through hole and disposed between the backplate and the display panel, wherein the support member surrounds the sensor.

2. The display device according to claim 1, wherein the display panel further comprises:
a first substrate, adjacent to the first polarizing plate;
a second substrate, disposed corresponding to the first substrate and adjacent to the second polarizing plate;
a liquid crystal layer, disposed between the first substrate and the second substrate;
a stopper wall, disposed between the first substrate and the second substrate and configured to define a first region of the display region and a second region adjacent to the first region; and
a light modulating layer, disposed between the liquid crystal layer and the second substrate and having a first opening region,
wherein the first region corresponds to the sensor, and the first opening region corresponds to the first region.

3. The display device according to claim 2, wherein a distance between the sensor and the display panel is D, a field of view angle of the sensor is θ, a width of the first region is W, and $0 < W \leq 4*D*\tan(\theta/2)$.

4. The display device according to claim 2, wherein a top view shape of the stopper wall is a closed shape.

5. The display device according to claim 2, wherein, in a top view, the stopper wall surrounds the sensor and the at least one light emitting unit.

6. The display device according to claim 5, wherein an output light wavelength of the at least one light emitting unit corresponds to an absorption wavelength of the sensor.

7. The display device according to claim 5, wherein the at least one light emitting unit is located outside the first through hole.

8. The display device according to claim 5, wherein the first opening region is larger than the first through hole.

9. The display device according to claim 1, wherein the support member is a hollow sleeve.

10. The display device according to claim 1, wherein a material of the support member comprises a light absorbing material or a light reflecting material, or a light absorbing layer or a light reflecting layer is formed on a side wall of the support member.

11. The display device according to claim 1, wherein the light emitting units comprise a plurality of first light emitting units and at least one second light emitting unit, wherein a wavelength of the first light emitting units is different from a wavelength of the at least one second light emitting unit, and the at least one second light emitting unit is disposed corresponding to the display region.

12. The display device according to claim 11, wherein a shortest distance between the at least one second light emitting unit and the first through hole is 3 mm to 4500 mm.

13. The display device according to claim 11, wherein the first light emitting units are visible light emitting units, and the at least one second light emitting unit is a non-visible light emitting unit.

14. The display device according to claim 11, wherein the number of the at least one second light emitting unit is plural, and the second light emitting units are disposed in a concentrated manner adjacent to the first through hole.

15. The display device according to claim 11, wherein the number of the at least one second light emitting unit is plural, and the second light emitting units are dispersedly disposed on the light board.

16. The display device according to claim 1, wherein the sensor is a light sensor.

17. The display device according to claim 1, wherein a transmission axis of the first polarizing plate is perpendicular to a transmission axis of the second polarizing plate.

* * * * *